(12) United States Patent
Gooding et al.

(10) Patent No.: US 10,573,006 B2
(45) Date of Patent: Feb. 25, 2020

(54) SELECTION OF A SUBSET OF ATLASES FROM A SET OF CANDIDATE ATLASES

(71) Applicant: Mirada Medical Limited, Oxford (GB)

(72) Inventors: Mark Gooding, Oxford (GB); Timor Kadir, Oxford (GB); Aymeric Larrue, Mitcham (GB)

(73) Assignee: Mirada Medical Limited, Oxford (GB)

( * ) Notice: Subject to any disclaimer, the term of this patent is extended or adjusted under 35 U.S.C. 154(b) by 149 days.

(21) Appl. No.: 15/735,284

(22) PCT Filed: Jun. 10, 2016

(86) PCT No.: PCT/EP2016/063248
§ 371 (c)(1),
(2) Date: Dec. 11, 2017

(87) PCT Pub. No.: WO2016/198568
PCT Pub. Date: Dec. 15, 2016

(65) Prior Publication Data
US 2018/0174302 A1 Jun. 21, 2018

(30) Foreign Application Priority Data
Jun. 11, 2015 (GB) .................................. 1510217.1

(51) Int. Cl.
*G06T 7/12* (2017.01)
*G06T 7/174* (2017.01)

(52) U.S. Cl.
CPC .............. *G06T 7/12* (2017.01); *G06T 7/174* (2017.01); *G06T 2207/10072* (2013.01);
(Continued)

(58) Field of Classification Search
None
See application file for complete search history.

(56) References Cited

U.S. PATENT DOCUMENTS

| 2014/0247977 A1* | 9/2014 | Han | G06K 9/34 382/159 |
| 2015/0178938 A1* | 6/2015 | Gorman, III | G06T 7/174 382/131 |

(Continued)

OTHER PUBLICATIONS

Sanroma Gerard et al: "Learning to Rank Atlases for Multiple-Atlas Segmentation", IEEE Transactions on Medical Imaging, IEEE Service Center, Piscataway, NJ, US, vo 1 • 33, No. 10, Oct. 1, 2014 (Oct. 1, 2014), pp. 1939-1953, XP011560122, ISSN: 0278-0062, DOI: 10.1109/TMI.2014.2327516 [retrieved on Sep. 29, 2014] abstract sections "II.A. Overview", "III. Experiments".

(Continued)

*Primary Examiner* — Fayyaz Alam
(74) *Attorney, Agent, or Firm* — Frank M. Scutch, III (57) ABSTRACT

A method and apparatus for selecting a subset of atlases from a set of candidate atlases. The method comprises: for each candidate atlas n within the set of N candidate atlases, computing an auto-contouring performance measure in relation to each training atlas t within a subset of a set of T training atlases; for each pair combination of candidate atlas n and training atlas t for which an auto-contouring performance measure has been computed, deriving a score based on the computed auto-contouring performance measures; for each candidate atlas n within the set of N candidate atlases, aggregating the derived scores for each pair combination comprising that candidate atlas n; and selecting a subset of M candidate atlases from the set of N candidate atlases based on the aggregated scores therefor.

15 Claims, 8 Drawing Sheets

(52) U.S. Cl.
CPC ............... *G06T 2207/10081* (2013.01); *G06T 2207/20081* (2013.01); *G06T 2207/20128* (2013.01); *G06T 2207/30004* (2013.01)

(56) References Cited

U.S. PATENT DOCUMENTS

| | | | | |
|---|---|---|---|---|
| 2016/0300120 | A1* | 10/2016 | Haas | G06K 9/6206 |
| 2016/0307319 | A1* | 10/2016 | Miller | A61B 5/055 |
| 2016/0343127 | A1* | 11/2016 | Miller | A61B 5/055 |

OTHER PUBLICATIONS

Ali R Khan et al: "Robust Atlas-Based Brain Segmentation Using Multi-structure Confidence-Weighted Registration", Sep. 20, 2009 (Sep. 20, 2009), Medical Image Computing and Computer-Assisted Intervention A? MICCAI 2009, Springer Berlin Heidelberg, Berlin, Heidelberg, pp. 549-557, XP019130497, ISBN: 978-3-642-04270-6 abstract sections "1 Introduction", "2.2 Segmentation Confidence Maps".

Albert K. Hoang Duc et al: "Using Manifold Learning for Atlas Selection in Multi-Atlas Segmentation", PLOS One, vol. 8, No. 8, Aug. 2, 2013 (Aug. 2, 2013), p. e70059, XP055198316, DOI: 10.1371/journal.pone.0070059 abstract sections "1.2 Overview", "1.3 Manifold Learning", "1.4 Distance between Pairs of Images", 2.1 Optimizing Manifold Learning Parameters Using a Manually Segmented Data Set of 110 Atlases, "Conclusions".

* cited by examiner

|  | Atlas 1 | Atlas 2 | Atlas 3 | ... | Atlas N |
|---|---|---|---|---|---|
| Training case 1 | 0.82 | 0.76 | 0.56 | ... | 0.84 |
| Training case 2 | 0.79 | 0.74 | 0.85 | ... | 0.58 |
| Training case 3 | 0.65 | 0.83 | 0.72 | ... | 0.66 |
| ... | ... | ... | ... | ... | ... |
| Training case T | 0.68 | 0.74 | 0.71 | ... | 0.83 |

FIG. 4

|  | Atlas 1 | Atlas 2 | Atlas 3 | ... | Atlas N |
|---|---|---|---|---|---|
| Training case 1 | 1 | 0 | 0 | ... | 2 |
| Training case 2 | 1 | 0 | 2 | ... | 0 |
| Training case 3 | 0 | 2 | 1 | ... | 0 |
| ... | ... | ... | ... | ... | ... |
| Training case T | 0 | 1 | 0 | ... | 2 |

FIG. 5

|  | Atlas 1 | Atlas 2 | Atlas 3 | ... | Atlas N |
|---|---|---|---|---|---|
| Training case 1 | 1 | 0.25 | 0 | ... | 1 |
| Training case 2 | 0.25 | 0.25 | 1 | ... | 0 |
| Training case 3 | 0 | 1 | 0.25 | ... | 0 |
| ... | ... | ... | ... | ... | ... |
| Training case T | 0 | 0.25 | 0.25 | ... | 1 |

SELECTION OF A SUBSET OF ATLASES FROM A SET OF CANDIDATE ATLASES

FIELD OF THE INVENTION

This invention relates to a method and apparatus for selecting a subset of atlases from a set of candidate atlases, and in particular to a method of selecting from a set of N candidate atlases at least one subset of M candidate atlases for use by at least one medical image auto-contouring system.

BACKGROUND OF THE INVENTION

In medical diagnosis and treatment procedures, it is often necessary for medical staff to delineate objects on a medical image of a patient. For example, in radiotherapy treatment a radiation oncologist is normally required to delineate a tumour and target volume on a medical image of the patient for radiotherapy planning. The medical image is normally a computed tomography (CT) scan, although it may be another scanning modality image type such as a magnetic resonance (MR) scan, Positron Emission Tomography (PET) scan, etc. It is also often necessary to contour 'normal' (i.e. healthy) organs, considered organs at risk on the planning image. This is done so that radiotherapy planning software, which (semi-)automatically calculates a treatment plan, can maximise the planned radiation dose to the target volume and tumour, while minimising radiation dose to healthy organs.

A medical scan provides a 'dataset'. The dataset comprises digital information about the value of a variable at each of many spatial locations in either a two-dimensional or (more typically) a three-dimensional space. In the case of a 3D volumetric dataset, the scan image is typically made up of a stack of 2D cross-sectional images. It is to be understood that the term 'image' used herein may refer to either a three-dimensional volumetric image dataset or a two-dimensional planar image dataset, unless otherwise stated or as may be apparent from the context within which the term is used.

The process of delineation is known as contouring. Typically, contours are drawn in two dimensions (2D) on cross-sectional images, although the planning medical image is typically a three dimensional (3D) volumetric image. As such, the delineation of an object such as a tumour, organ, etc. would consist of a stack of 2D contours, representing a volumetric outline of the object being delineated. Contouring can also be performed in 3D using some systems. Since delineation can be both 2D and 3D, the term 'structure' is used to represent the delineation of an object, whether 2D or 3D. Where the term contour is used, this will indicate a single 2D delineation only. However, the term contouring may indicate the process of delineation in either 2D or 3D to form a structure.

Manual contouring, as generally performed for radiotherapy contouring, is time consuming and is one of the bottlenecks in the treatment planning process, particularly for advanced treatments needing detailed contouring. Accordingly, systems have been developed for generating structures automatically, known as auto-contouring.

One approach to auto-contouring is atlas-based auto-contouring. An atlas consists of a medical image, normally a CT scan, with one or more structures that have previously been delineated by an expert. On receiving a new (patient) medical image to be delineated, the auto-contouring system would align the atlas to the patient image using a process known as image registration. The contours from the atlas would then be mapped onto the patient image using the calculated registration. The auto-contouring system would then return the mapped structures as a starting point for manual contouring of the patient image, whereby an expert (e.g. an radiation oncologist) is able edit the mapped structures to ensure the accuracy of the delineation.

Auto-contouring systems can help to reduce the amount of time a user is required to spend delineating a patient image. However, the accuracy of the auto-contouring has a significant impact on the amount of editing of the mapped structure(s) a user is required to perform, and thus the effectiveness of the auto-contouring systems in reducing the amount of time a user is required to spend delineating a patient image.

Two approaches have been demonstrated to improve atlas-based auto-contouring, both rather ambiguously referred to as multi-atlas auto-contouring.

For the first of these two multi-atlas auto-contouring approaches (herein after referred to as 'multi-atlas fusion auto-contouring'), multiple atlases are registered to the patient image, and their respective structures mapped onto the patient image. This results in multiple structures being mapped onto the patient image for an object being delineated. The multiple structures are then merged, or 'fused', for each object into a consensus structure.

For the second of these two multi-atlas auto-contouring approaches (herein after referred to as 'multi-atlas selection auto-contouring'), the patent image is compared to multiple atlases and the 'most similar' atlas to the patient image is selected. Selection methods include similarity measures between the registered images (e.g. mutual information) and similarity between meta-data of the images (e.g. patient age and sex). The selected atlas is then used to auto-contour the patient image.

These two approaches may also be combined such that a subset of atlases from the full set of atlases are selected based on their similarity to the patient image. The selected subset of atlases may then be used to auto-contour the patient image using the multi-atlas fusion auto-contouring approach.

Such multi-atlas auto-contouring approaches have been widely published, for example in:
(i) Han, Xiao, et al. "Atlas-based auto-segmentation of head and neck CT images." Medical Image Computing and Computer-Assisted Intervention—MICCAI 2008. Springer Berlin Heidelberg, 2008. 434-441.
(ii) Ramus, Liliane, and Grégoire Malandain. "Multi-atlas based segmentation: Application to the head and neck region for radiotherapy planning." MICCAI Workshop Medical Image Analysis for the Clinic-A Grand Challenge. 2010.
(iii) Aljabar, Paul, et al. "Multi-atlas based segmentation of brain images: atlas selection and its effect on accuracy." Neuroimage 46.3 (2009): 726-738.
(iv) Rohlfing, Torsten, et al. "Evaluation of atlas selection strategies for atlas-based image segmentation with application to confocal microscopy images of bee brains." NeuroImage 21.4 (2004): 1428-1442.

Over time, more and more medical images become (expertly) delineated and thus become available as atlases for use in auto-contouring systems. Advantageously, the greater the 'pool' of available atlases for auto-contouring, the greater the potential accuracy of the multi-atlas auto-contouring systems. However, the use of large atlas databases during auto-contouring has a number of drawbacks for clinical implementation:

1. The atlas database must be distributed to, and stored at, each location (e.g. terminal/computer) where the auto-contouring system is being used—the larger the database the more data that must be distributed and stored; and
2. The larger the database, the greater the computational burden for the auto-contouring process.

Neither the distribution/storing of a large atlas database, nor the computational burden of processing a large atlas database as part of a multi-atlas auto-contouring process scale well as the database size increases. Accordingly, for practical clinical implementations it is necessary to restrict the size of the atlas databases used by a multi-atlas auto-contouring systems to, say, less than twenty of the 'best' atlases.

Thus, a challenge arises of how to select (offline) the best five or ten atlases from the larger pool of potentially hundreds or even thousands of available atlases for distribution to and clinical use (online) by the auto-contouring systems.

U.S. Pat. No. 8,411,950 discloses a proposed method for such an offline selection of a subset of M atlases from a larger group (pool) of N candidate atlases, and the subsequent use of the selected subset of M atlases in a multi-atlas selection auto-contouring system. However, the proposed method of U.S. Pat. No. 8,411,950 suffers from a number of drawbacks:
1. The offline selection method taught in U.S. Pat. No. 8,411,950 is specifically targeted at evaluating the performance of subsets of atlases in relation to the specific multi-atlas selection auto-contouring method disclosed therein. In particular, the offline selection method taught in U.S. Pat. No. 8,411,950 involves a calculating a regression to a similarity measure used in the target multi-atlas selection auto-contouring method. Changing the similarity measured used in the multi-atlas selection auto-contouring method would require re-running the selection process for the new similarity measure. As such, the selected subset of M atlases is only applicable to multi-atlas auto-contouring systems that utilise the specific multi-atlas selection auto-contouring method at which the selection process is targeted.
2. The offline selection method taught in U.S. Pat. No. 8,411,950 consists of a combinatorial search of every combination of subset of M atlases. For example, selecting a subset of 10 atlases from a pool of, say, 60 candidate atlases would require 75,394 million subset combinations to be assessed. Even if the evaluation process for each combination took 1 millisecond, this would require over two years of computation. Noting that in practice a pool of candidate atlases could consists of hundreds or even thousands of atlases, such a computationally intensive method is not feasible in practice. Furthermore, as the pool of candidate atlases is added and evolves/grows over time, the selection of a subset of 'best' atlases should be performed periodically to take into account new candidate atlases added to the larger pool.
3. The offline selection method taught in U.S. Pat. No. 8,411,950 assumes a single delineation structure per atlas. In clinical practice, many delineation structures representing different regions or organs may be present on each atlas. How the offline selection method taught in U.S. Pat. No. 8,411,950 could be adapted for atlases with multiple structures is not apparent.

Thus, there is a need for an improved technique for the offline selection of a subset of atlases from a larger pool of candidate atlases, for distribution to and clinical use (online) by multi-atlas auto-contouring systems.

SUMMARY OF THE INVENTION

According to a first aspect of the present invention, there is provided a method of selecting from a set of N candidate atlases at least one subset of M candidate atlases for use by at least one medical image auto-contouring system. The method comprises:
  for each candidate atlas n within the set of N candidate atlases, computing at least one auto-contouring performance measure in relation to each training atlas t within at least a subset of a set of T training atlases;
  for each pair combination of candidate atlas n and training atlas t for which an auto-contouring performance measure has been computed, deriving a score based at least partly on the respective auto-contouring performance measure;
  for each candidate atlas n within the set of N candidate atlases, aggregating the derived scores for each pair combination for which an auto-contouring performance measure has been computed for that candidate atlas n; and
  selecting at least one subset of M candidate atlases from the set of N candidate atlases based at least partly on the aggregated scores therefor.

In this manner, the M 'best' candidate atlases from the set of N candidate atlases making up, say, the entire pool of available candidate atlases may be selected offline, allowing the subset of M candidate atlases to be distributed to, stored locally at, and used for clinical auto-contouring by auto-contouring systems, leading to better computational efficiency, improved contouring performance and reduced storage within the clinical systems. The method described is computationally efficient in calculating the subset by allowing the atlases to be considered independently rather than in combination with each other. Notably, the selection technique described herein is not specifically targeted at evaluating the performance of subsets of atlases in relation to a specific multi-atlas selection auto-contouring method, and so the resulting selected subset of M atlases is not restricted to being applicable to multi-atlas auto-contouring systems that utilise a specific multi-atlas selection auto-contouring method. Furthermore, the selection technique described herein does not rely on a combinatorial search of every combination of subset of M atlases, making the implementation of the proposed technique feasible in a real-world clinical situation.

In some optional embodiments, the method may comprise computing at least one auto-contouring performance measure for each candidate atlas n within the set of N candidate atlases based at least partly on at least one of:
  the DICE coefficient;
  the Jaccard index;
  the Hausdorff distance; and
  the mean distance to agreement.

In some optional embodiments, the score derived for each pair combination of candidate atlas n and training atlas t for which an auto-contouring performance measure has been computed may comprise at least one of:
  a score directly derived from the auto-contouring performance measure;
  a relative weighting score derived with respect to all pair combinations of candidate atlases n and a common training atlas t for which an auto-contouring performance measures have been computed;

a relative weighting score derived with respect to a number of training atlases for which at least one auto-contouring performance measure has been computed for the candidate atlas n of the respective pair combination;

an absolute weighting score for the auto-contouring performance measure; and an editing time prediction value.

In some optional embodiments, the method may comprise selecting for the at least one subset of candidate atlases the candidate atlases with the M most favourable aggregated scores.

In some optional embodiments, the method may comprise computing auto-contouring performance measures for each of a plurality of structures of each candidate atlas n within the set of N candidate atlases in relation to each training atlas t within the respective subset of training atlases.

In some optional embodiments, the method may comprise, for each pair combination of candidate atlas n and training atlas t for which an auto-contouring performance measure has been computed, deriving a score for each of the plurality of structures within the candidate atlas n based at least partly on the computed auto-contouring performance measures.

In some optional embodiments, the score for each structure may be derived further based at least partly on a structure weighting value.

In some optional embodiments, the method may comprise, for each candidate atlas n within the set of N candidate atlases, aggregating the derived scores for the plurality of structures for each pair combination of candidate atlas and training atlas comprising that candidate atlas n and a training atlas t for which auto-contouring performance measures have been computed, and selecting the at least one subset of M candidate atlases from the set of N candidate atlases based at least partly on the aggregated scores for all structures for each pair combination of candidate atlas n and training atlas t for which an auto-contouring performance measure has been computed.

In some optional embodiments, the method may further comprise determining whether at least one further subset of M candidate atlases is to be selected from the set of N candidate atlases, and if it is determined that a further subset of M candidate atlases is to be selected from the set of N candidate atlases:

removing from the set of T training atlases those training atlases T' for which the candidate atlases within the previously selected subset of M candidate atlases achieved a favourable auto-contouring performance to create a new set of (T-T') training atlases;

for each candidate atlas n within the set of N candidate atlases, computing at least one auto-contouring performance measure in relation to each training atlas t within at least a subset of the new set of (T-T') training atlases;

for each pair combination of candidate atlas n and training atlas t for which an auto-contouring performance measure has been computed, deriving a score based at least partly on the respective auto-contouring performance measure;

for each candidate atlas n within the set of N candidate atlases, aggregating the derived scores for each pair combination for which an auto-contouring performance measure has been computed for that candidate atlas n; and selecting at least one further subset of M candidate atlases from the set of N candidate atlases based at least partly on the aggregated scores therefor.

In some optional embodiments, the method may further comprise determining whether at least one further subset of M candidate atlases is to be selected from the set of N candidate atlases, and if it is determined that a further subset of M candidate atlases is to be selected from the set of N candidate atlases:

removing the candidate atlases within the previously selected subset of M candidate atlases from the set of N candidate atlases to create a new set of (N-M) candidate atlases;

removing from the set of T training atlases those training atlases T' for which the candidate atlases within the previously selected subset of M candidate atlases achieved a favourable auto-contouring performance to create a new set of (T-T') training atlases;

for each candidate atlas n within the new set of (N-M) candidate atlases, computing at least one auto-contouring performance measure in relation to each training atlas t within at least a subset of the new set of (T-T') training atlases;

for each pair combination of candidate atlas n from the new set of (N-M) candidate atlases and training atlas t for which an auto-contouring performance measure has been computed, deriving a score based at least partly on the respective auto-contouring performance measures;

for each candidate atlas n within the new set of (N-M) candidate atlases, aggregating the derived scores for each pair combination for which an auto-contouring performance measure has been computed for that candidate atlas n; and selecting at least one further subset of M candidate atlases from the new set of (N-M) candidate atlases based at least partly on the aggregated scores therefor.

In some optional embodiments, auto-contouring performance measures may be computed for all candidate atlases within the set of N candidate atlases in relation to the same subset of training atlases from the set of T training atlases.

In some optional embodiments, auto-contouring performance measures may be computed for different candidate atlases within the set of N candidate atlases in relation to different subsets of training atlases from the set of T training atlases.

In some optional embodiments, the set of T training atlases may comprise the set of N candidate atlases.

In some optional embodiments, for each candidate atlas n within the set of N candidate atlases, the subset of training atlases from the set of T training atlases in relation to which an auto-contouring performance measure may be computed comprises the set of T training atlases less the candidate atlas n.

According to a second aspect of the present invention, there is provided an atlas management system comprising at least one processor module arranged to select from a set of N candidate atlases at least one subset of M candidate atlases for use by at least one medical image auto-contouring system. The at least one processor module is arranged to:

for each candidate atlas n within the set of N candidate atlases, compute at least one auto-contouring performance measure in relation to each training atlas t within at least a subset of a set of T training atlases;

for each pair combination of candidate atlas n and training atlas t for which an auto-contouring performance measure has been computed, derive a score based at least partly on the respective auto-contouring performance measures;

for each candidate atlas n within the set of N candidate atlases, aggregate the derived scores for each pair combination for which an auto-contouring performance measure has been computed for that candidate atlas n; and select at least one subset of M candidate atlases from the set of N candidate atlases based at least partly on the aggregated scores therefor.

In some optional embodiments, the at least one processor module may be arranged to derive a score for each pair combination of candidate atlas n and training atlas t for which an auto-contouring performance measure has been computed comprising at least one of:

a score directly derived from the auto-contouring performance measure;

a relative weighting score derived with respect to all pair combinations of candidate atlases n and a common training atlas t for which an auto-contouring performance measures have been computed;

a relative weighting score derived with respect to a number of training atlases for which at least one auto-contouring performance measure has been computed for the candidate atlas n of the respective pair combination;

an absolute weighting score for the auto-contouring performance measure; and an editing time prediction value.

In some optional embodiments, the at least one processor module may be arranged to compute auto-contouring performance measures for each of a plurality of structures of each candidate atlas n within the set of N candidate atlases in relation to each training atlas t within the respective subset of training atlases.

In some optional embodiments, the at least one processor module may be arranged to, for each pair combination of candidate atlas n and training atlas t for which an auto-contouring performance measure has been computed, derive a score for each of the plurality of structures within the candidate atlas n based at least partly on the computed auto-contouring performance measures.

In some optional embodiments, the at least one processor module may be arranged to derive the score for each structure further based at least partly on a structure weighting value.

In some optional embodiments, the at least one processor module may be arranged to, for each candidate atlas n within the set of N candidate atlases, aggregate the derived scores for the plurality of structures for each pair combination of candidate atlas and training atlas comprising that candidate atlas n and a training atlas t for which auto-contouring performance measures have been computed, and select the at least one subset of M candidate atlases from the set of N candidate atlases based at least partly on the aggregated scores for all structures for each pair combination of candidate atlas n and training atlas t for which an auto-contouring performance measure has been computed.

In some optional embodiments, the at least one processor module may be further arranged to determine whether at least one further subset of M candidate atlases is to be selected from the set of N candidate atlases, and if it is determined that a further subset of M candidate atlases is to be selected from the set of N candidate atlases:

remove from the set of T training atlases those training atlases T' for which the candidate atlases within the previously selected subset of M candidate atlases achieved a favourable auto-contouring performance to create a new set of (T-T') training atlases;

for each candidate atlas n within the set of N candidate atlases, compute at least one auto-contouring performance measure in relation to each training atlas t within at least a subset of the new set of (T-T') training atlases;

for each pair combination of candidate atlas n and training atlas t for which an auto-contouring performance measure has been computed, derive a score based at least partly on the respective auto-contouring performance measures;

for each candidate atlas n within the set of N candidate atlases, aggregate the derived scores for each pair combination for which an auto-contouring performance measure has been computed for that candidate atlas n; and select at least one further subset of M candidate atlases from the set of N candidate atlases based at least partly on the aggregated scores therefor.

In some optional embodiments, the at least one processor module may be further arranged to determine whether at least one further subset of M candidate atlases is to be selected from the set of N candidate atlases, and if it is determined that a further subset of M candidate atlases is to be selected from the set of N candidate atlases:

remove the candidate atlases within the previously selected subset of M candidate atlases from the set of N candidate atlases to create a new set of (N-M) candidate atlases;

remove from the set of T training atlases those training atlases T' for which the candidate atlases within the previously selected subset of M candidate atlases achieved a favourable auto-contouring performance to create a new set of (T-T') training atlases;

for each candidate atlas n within the new set of (N-M) candidate atlases, compute at least one auto-contouring performance measure in relation to each training atlas t within at least a subset of the new set of (T-T') training atlases;

for each pair combination of candidate atlas n from the new set of (N-M) candidate atlases and training atlas t for which an auto-contouring performance measure has been computed, derive a score based at least partly on the respective auto-contouring performance measure;

for each candidate atlas n within the new set of (N-M) candidate atlases, aggregate the derived scores for each pair combination for which an auto-contouring performance measure has been computed for that candidate atlas n; and select at least one further subset of M candidate atlases from the new set of (N-M) candidate atlases based at least partly on the aggregated scores therefor.

According to a third aspect of the present invention, there is provided a non-transitory computer program product having executable program code stored therein for selecting from a set of N candidate atlases at least one subset of M candidate atlases for use by at least one medical image auto-contouring system. The program code is operable for:

for each candidate atlas n within the set of N candidate atlases, computing at least one auto-contouring performance measure in relation to each training atlas t within at least a subset of a set of T training atlases;

for each pair combination of candidate atlas n and training atlas t for which an auto-contouring performance measure has been computed, deriving a score based at least partly on the respective auto-contouring performance measure;

for each candidate atlas n within the set of N candidate atlases, aggregating the derived scores for each pair combination for which an auto-contouring performance measure has been computed for that candidate atlas n; and selecting at least one subset of M candidate atlases from the set of N candidate atlases based at least partly on the aggregated scores therefor.

The non-transitory computer program product may comprise at least one from a group including: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention will now be described with reference to the accompanying drawings. However, it will be appreciated that the present invention is not limited to the specific embodiments herein described and as illustrated in the accompanying drawings. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
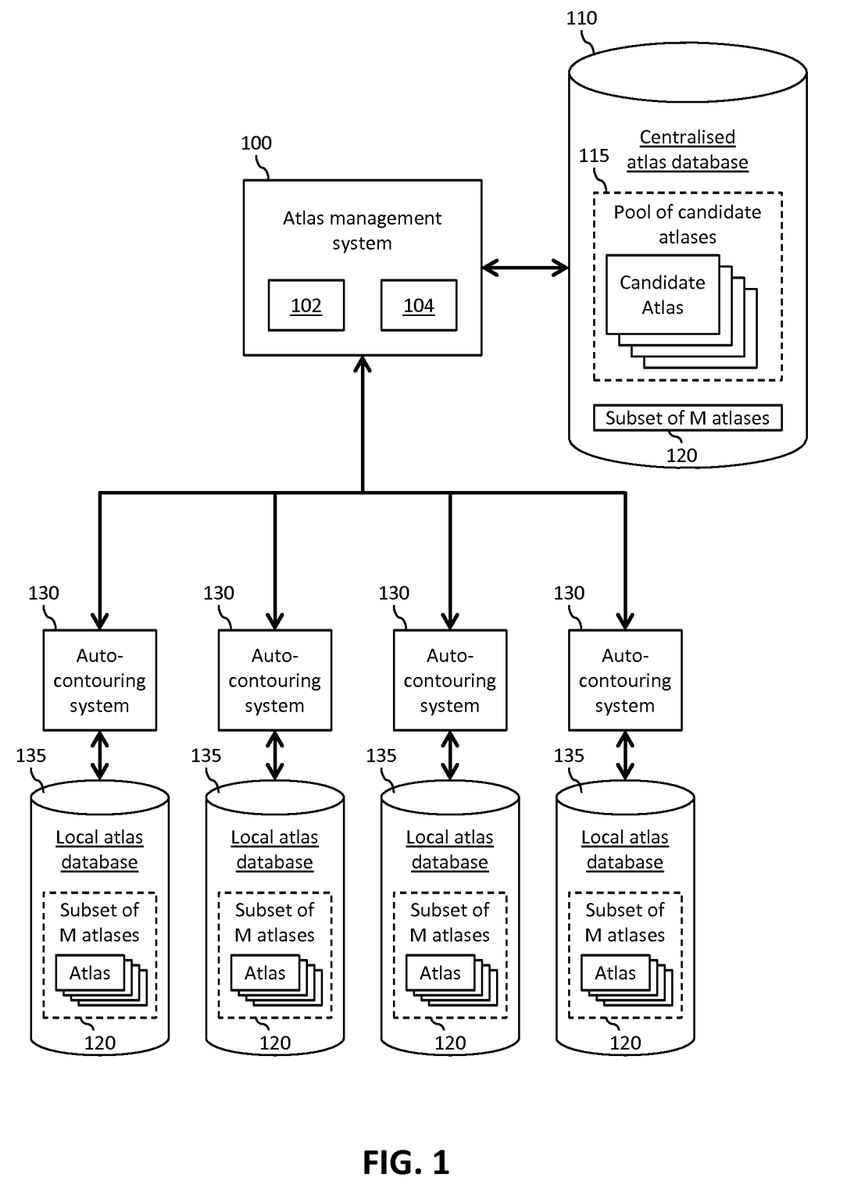
FIG. 1 illustrates a simplified block diagram of an atlas management system.

Referring first to FIG. 1, there is illustrated a simplified block diagram of an atlas management system 100. The atlas management system 100 is coupled to an atlas database 110 within which is stored a pool of atlases 115. Each atlas in the pool of atlases 115 comprises a medical image dataset and at least one defined structure delineating at least one object (e.g. region or organ) within the medical image. Typically, the pool of candidate atlases 115 comprises a large number of candidate atlases, for example potentially hundreds or even thousands of candidate atlases.

The atlas management system 100 comprises one or more processor modules 102 arranged to execute computer program code stored within one or more memory elements 104 of the atlas management system 100. In particular, the processor module(s) 102 is/are arranged to execute computer program code to select from a set of N candidate atlases a representative subset of M atlases 120. The selected subset of M atlases 120 may then be distributed to auto-contouring systems 130 and stored locally within local atlas databases 135. The auto-contouring systems 130 are then able to use the representative subset of M atlases 120 with atlas-based auto-contouring programmes.

The set of N candidate atlases may comprise the entire pool of candidate atlases 115 within the atlas database 110. Alternatively, it is contemplated that the set of N candidate atlases may comprise only a part of the pool of atlases 115 within the atlas database 110.

Figure 2:
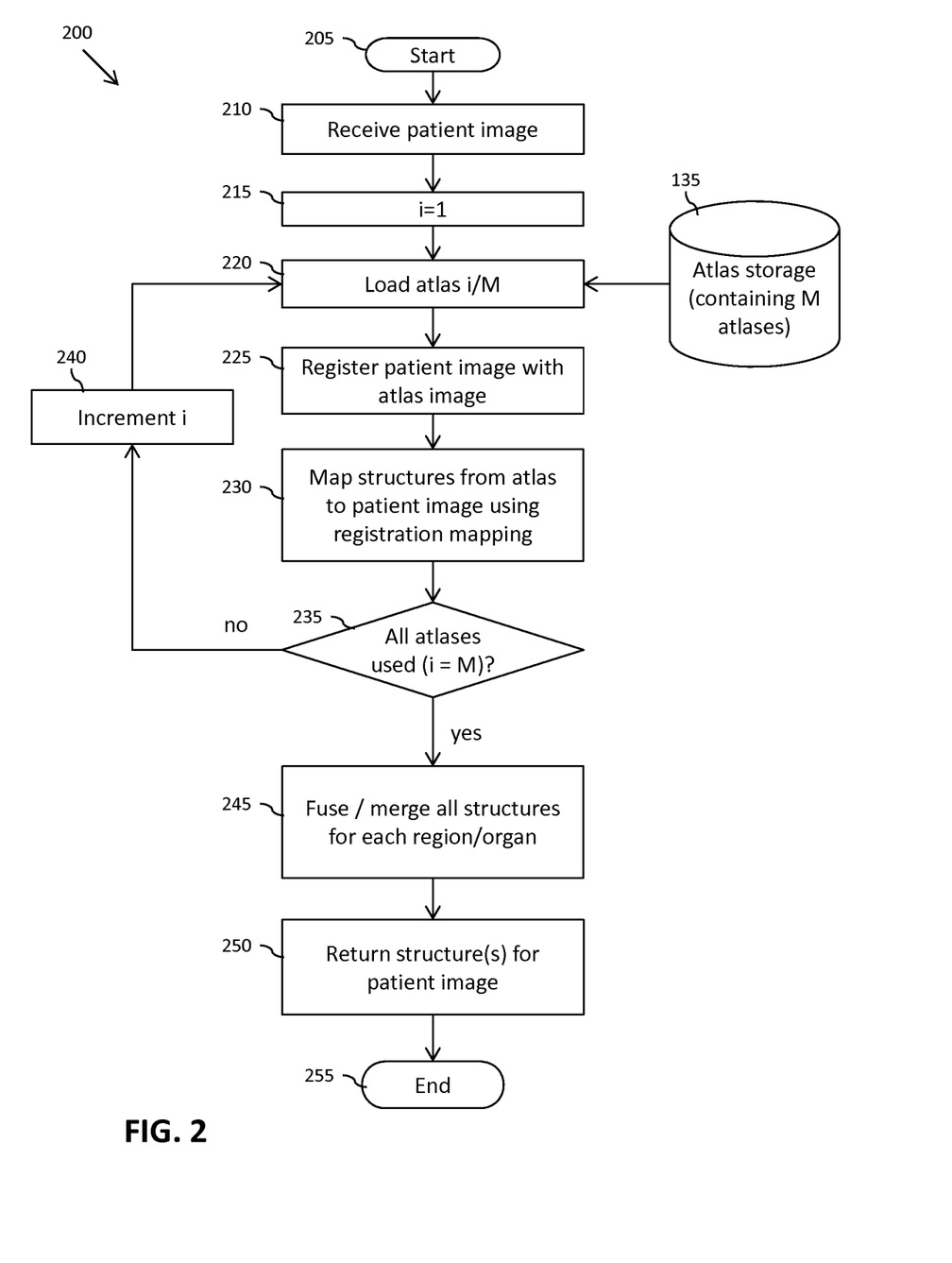
FIG. 2 illustrates a simplified flowchart of an example of a method of performing atlas-based auto-contouring.

FIG. 2 illustrates a simplified flowchart 200 of an example of a method of performing atlas-based auto-contouring, such as may be implemented within one or more of the auto-contouring systems 130 illustrated in FIG. 1. In particular, the flowchart 200 of FIG. 2 illustrates an example of a method of multi-atlas fusion auto-contouring. The method starts at 205 and moves on to 210 where a patient medical image to be delineated is received. A variable i is then initialised to comprise a value of '1', at 215, and a first atlas (atlas i/M) is loaded at 220 from a local database (such as a local database 135 illustrated in FIG. 1) containing the representative subset of M atlases 120. The patient medical image is registered to the loaded atlas at 225, and delineation structure(s) are mapped from the atlas to the patient medical image using the calculated registration, at 230. It is then determined whether delineation structures have been mapped to the patient medical image from all atlases within the representative subset of M atlases 120 (e.g. if i=M), at 235. If not all atlases within the representative subset of M atlases 120 have had their delineation structures mapped to the patient medical image, the variable i is incremented, at 240, and the method loops back to 220 where the next atlas from the representative subset of M atlases 120 is loaded. Once delineation structures have been mapped to the patient medical image from all atlases within the representative subset of M atlases 120, the method moves on to 245, where the mapped delineation structures for each object (e.g. region or organ) within the patient medical image are fused/merged to create a single (consensus) delineation structure for each object within the medical image. The resulting (consensus) delineation structure(s) is/are then returned (e.g. stored in memory or displayed to a user on a screen) at 250, and the method ends at 255.

It will be appreciated that the auto-contouring systems 130 are not limited to performing such a multi-atlas fusion auto-contouring, and may be arranged to perform substantially any auto-contouring method, for example multi-atlas selection auto-contouring.

Figure 3:
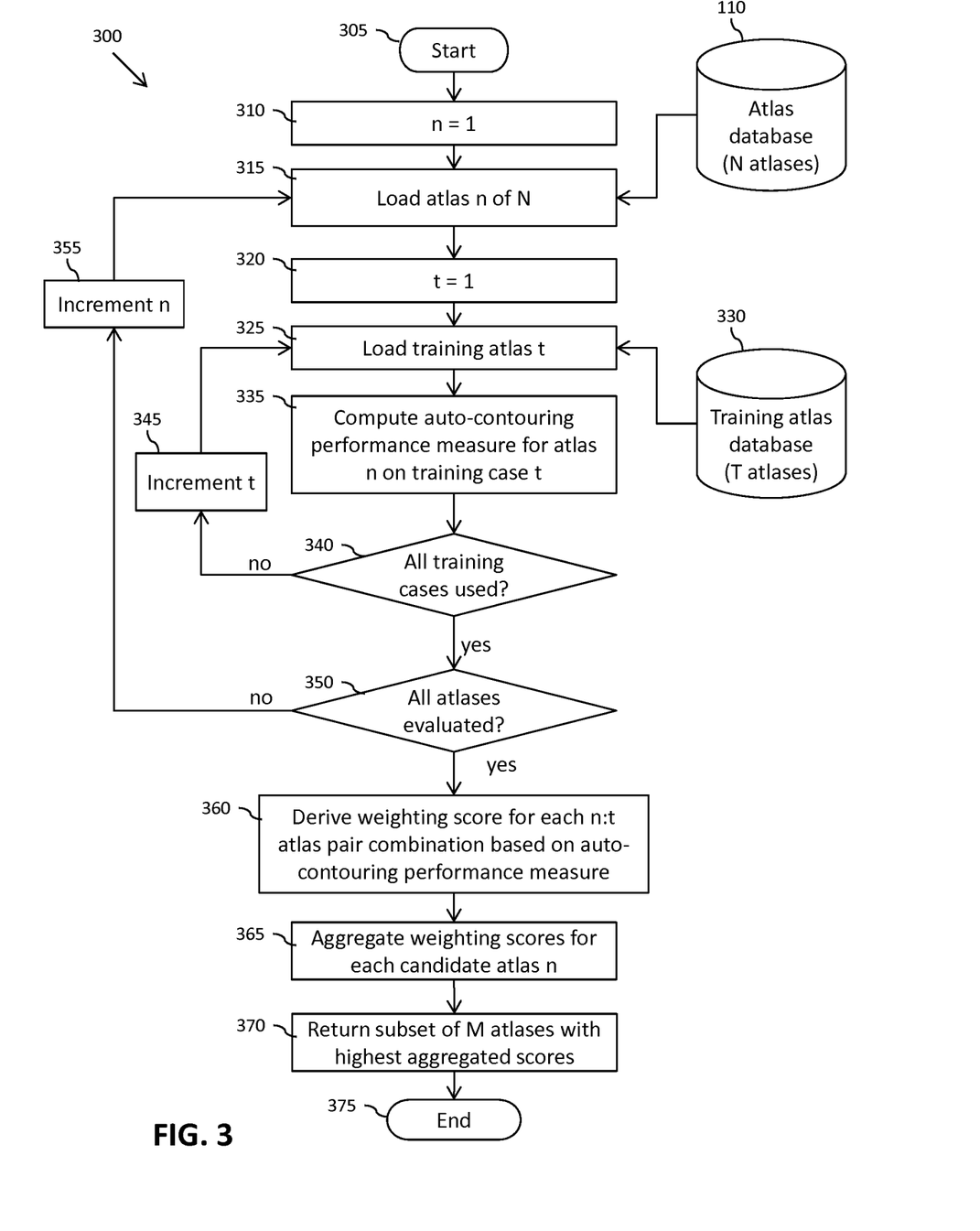
FIG. 3 illustrates a simplified flowchart of an example of a method of selecting from a set of N candidate atlases at least one subset of M candidate atlases.

Referring now to FIG. 3, there is illustrated a simplified flowchart 300 of an example of a method of selecting from a set of N candidate atlases at least one subset of M candidate atlases for use by at least one medical image auto-contouring system, such as may be performed by the one or more processor modules 102 of the atlas management system 100 of FIG. 1. The method illustrated in FIG. 3 starts at 305, and moves on to 310 where a variable n is initialised to a value of F. Next, at 315, a first candidate atlas (atlas n/N) is loaded at 315 from a database containing the set of N candidate atlases (such as the centralised atlas database 110 in FIG. 1). A further variable t is initialised to a value of '1' at 320, and a first training atlas (atlas t), from a subset of a set of T training atlases, is loaded at 325 from a database 330.

The subset of training atlases may comprise all training atlases within the set of T training atlases. Conversely the subset of training atlases may comprise only a part of the set of T training atlases. Furthermore, the subset may be predefined or may be randomly selected.

In some examples the set of T training atlases (set A) and the set of N candidate atlases (set B) may be unrelated; that is to say the intersection of the sets A and B may be empty (i.e. sets A and B are disjoint sets). However, it is contemplated that the sets A and B of candidate atlases and training atlases may intersect, and in particular it is contemplated that in some examples the set A of training atlases may consist of the same candidate atlases within the set B; that is to say A=(B) such that the number of training atlases equals the number of candidate atlases (T=N).

Referring back to FIG. 3, an auto-contouring performance measure is computed for the subject candidate atlas n in relation to the training atlas t, at 335. For example, the candidate atlas n may be registered with the training atlas t, and the delineation structure(s) of the candidate atlas n mapped to the training atlas t using the registration mapping. The mapped delineation structure(s) may then be compared with the existing (assumed accurate) delineation structure(s) of the training atlas t to assess the performance of the auto-contouring using the candidate atlas n on the training atlas t. Various measures for such assessing the performance of auto-contouring exist including, but not limited to, the DICE coefficient, the Jaccard index, the Hausdorff distance, the mean distance to agreement (MDA), etc. Furthermore, the performance measure may be calculated per structure within the atlases n/t, or could be evaluated over multiple structures. Examples of calculation on multiple structures would include, but not be limited to, the mean DICE coefficient for the structures or the maximum Hausdorff distance for the structures.

Having computed the auto-contouring performance measure for the current pair combination of candidate atlas n and training atlas t, it is then determined whether auto-contouring performance measures for the candidate atlas n have been computed for all training atlases in the subset of training atlases, at 340. If auto-contouring performance measures for the candidate atlas n have not been computed for all training atlases in the subset of training atlases, the variable t is incremented, at 345, and the method loops back to 325 where the next training atlas from the subset of training atlases is loaded.

Once auto-contouring performance measures for the candidate atlas n have been computed for all training atlases in the subset of training atlases, the method moves on to 350, where it is determined whether auto-contouring performance measures have been computed for all candidate atlases in the set of N candidate atlases (e.g. if n=N). If auto-contouring performance measures have not been computed for all candidate atlases in the set of N candidate atlases, the variable n is incremented, at 355, and the method loops back to 315 where the next candidate atlas from the set of N candidate atlases is loaded.

It is contemplated that the same subset of training atlases may be used to compute auto-contouring performance measures for all candidate atlases within the set of N candidate atlases. Alternatively, a plurality of different subsets of training atlases may be used to compute auto-contouring performance measures for the candidate atlases within the set of N candidate atlases. For example, a different subset of training atlases may be randomly selected from the set of T training atlases for each candidate atlas n, or for a certain number of candidate atlases. Alternatively, where the set of T training atlases and the set of N candidate atlases are the same (i.e. where N=T and each atlas in the set of training atlases is also within the set of candidate atlases), the subset of training atlases used to compute auto-contouring performance measures for a candidate atlas n may comprise the set of T training atlases less that candidate atlas n; thus the subset would comprise T−1 training atlases.

Furthermore, it is contemplated that a plurality of subsets of different sizes (i.e. consisting of different numbers of training atlases) may be used to compute auto-contouring performance measures for different candidate atlases. For example, the, or each, subset of training atlases may comprise randomly selected numbers of training atlases from the set of T atlases.

Figure 4:
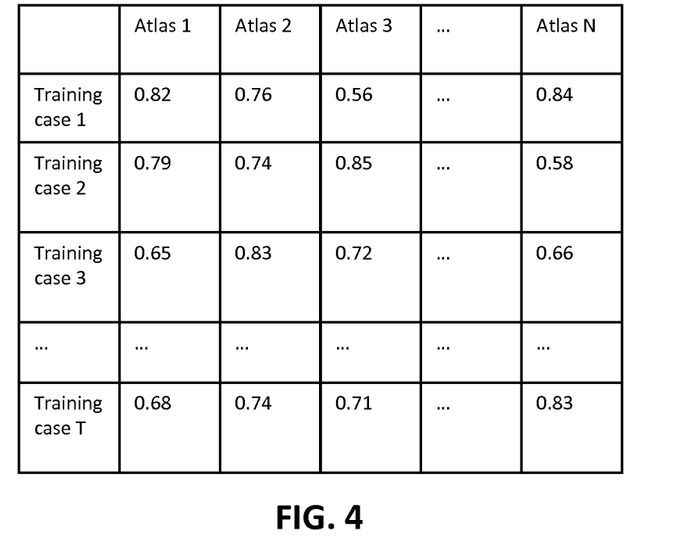
FIG. 4 illustrates a matrix comprising computed auto-contouring performance measures.

Once auto-contouring performance measures have been computed for all N candidate atlases in the set, the method moves on to 360 where a score is derived for each pair combination of candidate atlas n and training atlas t for which an auto-contouring performance measure has been computed based on the computed auto-contouring performance measures. For example, FIG. 4 illustrates a matrix comprising the computed auto-contouring performance measures for n:t atlas pair combinations (e.g. consisting of DICE coefficient values). In some examples, the computed auto-contouring performance measures may be used directly themselves as the scores for the n:t atlas pair combinations, or some other score directly derived from (e.g. a multiple/division of) the computed auto-contouring performance measures may be used as the scores for the n:t atlas pair combinations.

Figure 5:
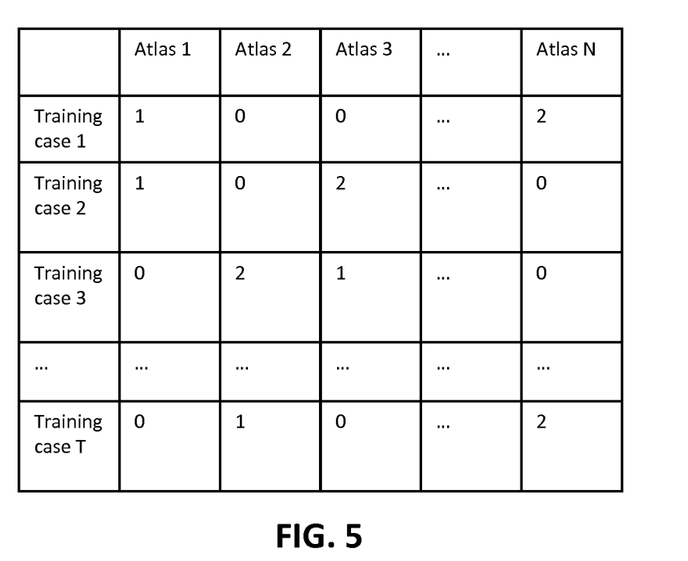
FIG. 5 illustrates a matrix comprising an example of relative weighting scores.

Alternatively, a relative weighting score for each n:t atlas pair combination may be derived with respect to the n:t atlas pair combinations. FIG. 5 illustrates a matrix comprising an example of such a relative weighting score. In the example illustrated in FIG. 5, the atlas pair combination for each training atlas t with the highest computed auto-contouring performance measure is assigned a weighting value of 2, whilst the atlas pair combination for each training atlas t with the second highest computed auto-contouring performance measure is assigned a weighting value of 1. All other atlas pair combinations are assigned a weighting value of 0.

Figure 6:
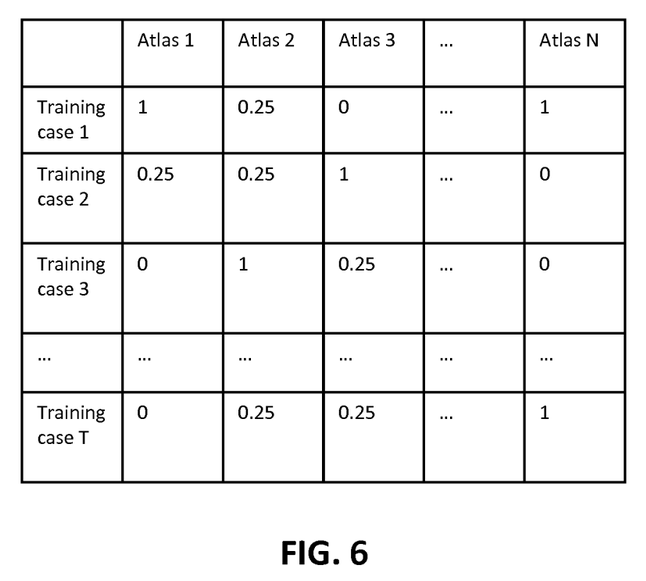
FIG. 6 illustrates a matrix comprising an example of absolute weighting scores.

Alternatively still, an absolute weighting score for each n:t atlas pair combination may be derived. FIG. 6 illustrates a matrix comprising an example of such an absolute weighting score. In the example illustrated in FIG. 6, all n:t atlas pair combinations having a computed auto-contouring performance measure greater than 0.8 have been assigned a weighting value of 1, whilst all n:t atlas pair combinations having a computed auto-contouring performance measure between 0.8 and 0.7 have been assigned a weighting value of 0.25 and all n:t atlas pair combinations having a computed auto-contouring performance measure less than 0.7 have been assigned a weighting value of 0.

As mentioned above, it is contemplated that in some examples, subsets of training atlases of different sizes may be used to compute auto-contouring performance measures for the candidate atlases. Accordingly, a relative weighting score for each n:t atlas pair combination may be derived with respect to the number of training atlases for which at least one auto-contouring performance measure was computed for the candidate atlas n of the respective n:t atlas pair combination.

Various other scoring systems are contemplated. For example, the computed auto-contouring performance measures may be converted into editing time prediction values representative of estimates of how much editing time would be required for, say, a clinician to manually edit the auto-contoured structure generated using the candidate atlas n to achieve the (accurate) structure of the training atlas t. Such a conversion may be based on test data or the like.

Referring back to FIG. 3, having derived the scores for each n:t atlas pair combination, the method moves on to 365 where for each candidate atlas n within the set of N candidate atlases, the derived scores for each pair combination comprising that candidate atlas n are aggregated. For example, in each of the examples illustrated in FIGS. 4 to 6, each column of scores is added together to derive an aggregate score for the respective candidate atlas n. The subset of M candidate atlases is then selected from the set of N candidate atlases based on the aggregated scores therefor, at 370. For example, the candidate atlases with the M most favourable (e.g. highest) aggregated scores are selected. The method of FIG. 3 then ends, at 375.

As will be appreciated by a skilled person, the larger the subset(s) of training atlases used to compute the auto-contouring performance measures for the candidate atlases, the more representative the selected subset of M candidate atlases will be with respected to the available set of T training atlases. However, the larger the subset(s) of training atlases used, the more computational intensive the process of selecting the subset of candidate atlases becomes. Accordingly, it is contemplated that the size of the subset(s) of training atlases used to compute the auto-contouring performance measures for the candidate atlases may be optimized to achieve as representative a subset of candidate atlases as possible whilst ensuring the computational intensity of the selection process does not become prohibitive.

The method described so far, and outlined in FIG. 3, enables the subset of M candidate atlases that performs best for the given set of T training atlases to be identified. However, distinct sub-groups may exist within the space of the full set of N candidate atlases and the training set of T atlases. For example, patients with different pathologies or attributes such as sex, age, weight, etc. may form such sub-groups with different appearance. If such groups exist within the set of N candidate atlases and the training set of T atlases, the method illustrated in FIG. 3 may be biased to select the subset of M candidate atlases most represented by the training data.

Figure 7:
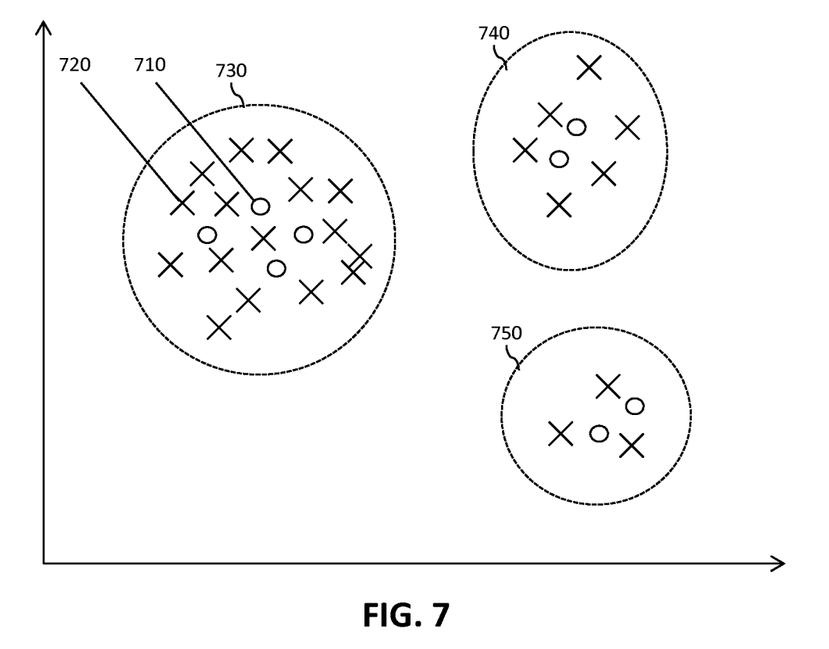
FIGS. 7 and 9 illustrate a set of N candidate atlases comprising multiple groups of candidate atlases.

For example, FIG. 7 illustrates a set of N candidate atlases, shown by circles 710, and the set of T training atlases, shown by crosses 720, within an arbitrary space whereby some separation between groups can be observed. In this example, three distinct groups exist highlighted by dashed ellipses 730, 740 and 750. If two candidate atlases 710 were to be selected as the subset of M atlases, it is likely that these candidate atlases 710 would be selected from the group 730, since this is best represented within the training set of T atlases and as such the candidate atlases 710 within this group 730 will score more highly overall.

Figure 8:
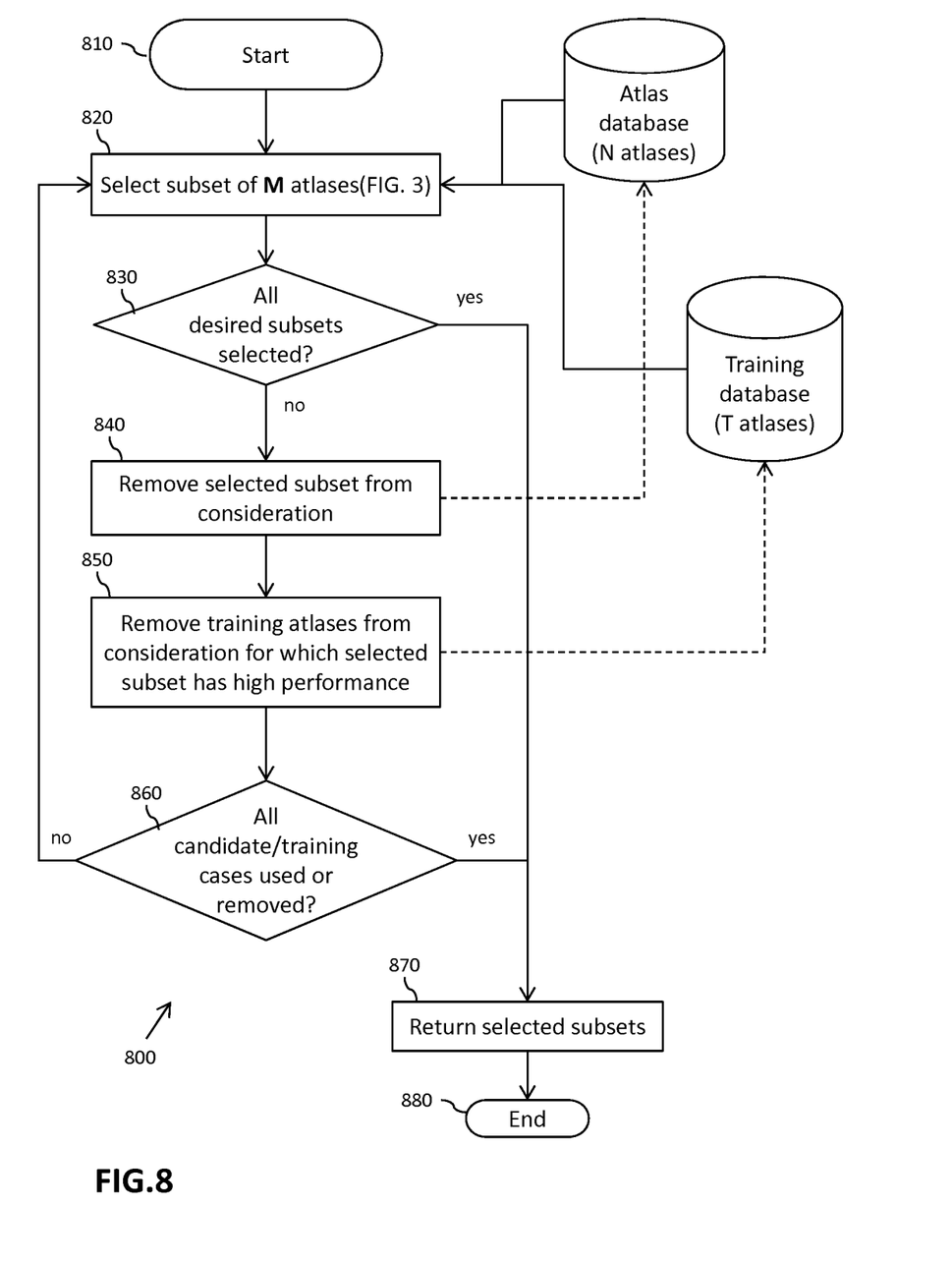
FIG. 8 illustrates a simplified flowchart of an example of an extension of the method of FIG. 3 for selecting multiple subsets of candidate atlases.

Identification and separation of such groups 730, 740, 750 can be beneficial in clinical practice to form multi-atlases tuned to perform optimally for a specific group. This can be achieved by extending the method illustrated in FIG. 3 to select multiple subsets of candidate atlases. FIG. 8 illustrates a simplified flowchart 800 of an example of such an extension of the method of FIG. 3 for selecting multiple subsets of candidate atlases.

The method starts at 810 and moves on to 820 where a first subset of M candidate atlases is selected from a set of N candidate atlases, for example by way of the method illustrated in FIG. 3. Next, at 830, it is determined whether all desired subsets have been selected. For example, such a decision may be made manually be a user indicating 'yes' or 'no', or based on a user-defined number of desired subsets. If it is determined that all desired subsets have been selected, the method moves on to 870 where the selected subset(s) are returned and the method ends at 880.

Referring back to 830, if it is determined that not all desired subsets have been selected, the method moves on to 840 where, in the illustrated example, the candidate atlases within the subset of M candidate atlases previously selected at 820 are removed from consideration for the next subset to be selected. That is to say, the candidate atlases within the subset of M candidate atlases previously selected at 820 are removed from the set of N candidate atlases to create a new set of (N-M) candidate atlases. Next, at 850, the training atlases T' for which the previously selected subset of M candidate atlases achieved a favourable auto-contouring performance are also removed from consideration for the next subset to be selected. That is to say, the training atlases T' for which the previously selected subset of M candidate atlases achieved a favourable auto-contouring performance are removed from the set of T training atlases to create a new set of (T-T') training atlases. The training atlases T' for which the previously selected subset of M candidate atlases achieved a favourable auto-contouring performance may be determined based on, for example, whether the auto-contouring performance measures computed therefor and/or the (weighted) scores derived therefrom exceeded a 'favourable' threshold value.

The method then moves on to 860, where it is determined whether all candidate atlases and/or training atlases have been removed from consideration (as described below). If all candidate atlases or all training atlases have been removed from consideration, the selection of a further (meaningful) subset of candidate atlases is deemed unachievable and the method moves on to 870 where the selected subset(s) of candidate atlases are returned and the method ends at 880.

Referring back to 860, if it is determined that at least some candidate atlases and at least some training atlases have not been removed from consideration, the method loops back to 820 where a further subset of M candidate atlases is selected from the new set of (N-M) candidate atlases using a subset of the new set of (T-T') training atlases.

Thus the method illustrated in FIG. 8 allows selection of different subsets of candidate atlases representing different sub-populations within the training database.

Figure 9:
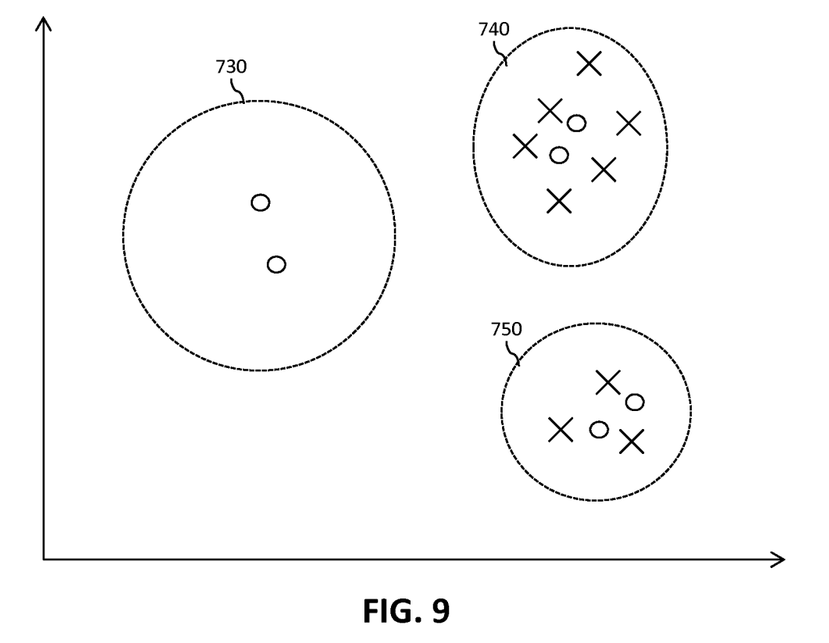

Advantageously, and as illustrated in FIG. 9, by removing the training atlases (T') for which the previously selected subset of M candidate atlases achieved a favourable auto-contouring performance (i.e. those from group 730 in FIG. 9) from consideration for the next subset of M candidate atlases to be selected, that group 730 of training atlases will not be taken into consideration, allowing the other groups 740, 750 of training atlases to have a greater influence on the selection of the next subset of M candidate atlases. When the method of FIG. 3 is performed again using the new set of (T-T') training atlases, as illustrated in FIG. 9, it is likely that a new subset of M candidate atlases would be selected from the group 740, since this has now become the best represented group within the new training set of (T-T') atlases, and as such the candidate atlases within this group 740 will score more highly overall.

In the example method illustrated in FIG. 8, the candidate atlases within the previously selected subset of M candidate atlases are also removed from consideration for the next subset of candidate atlases to be selected (i.e. removed from the set of N candidate atlases to create a new set of (N-M) candidate atlases). In this manner, the number of iterations of steps 315 to 350 that are required to be performed when selecting the next subset of candidate atlases may be reduced, thereby improving the computational efficiency for selecting the subsequent subsets of candidate atlases.

Figure 10:
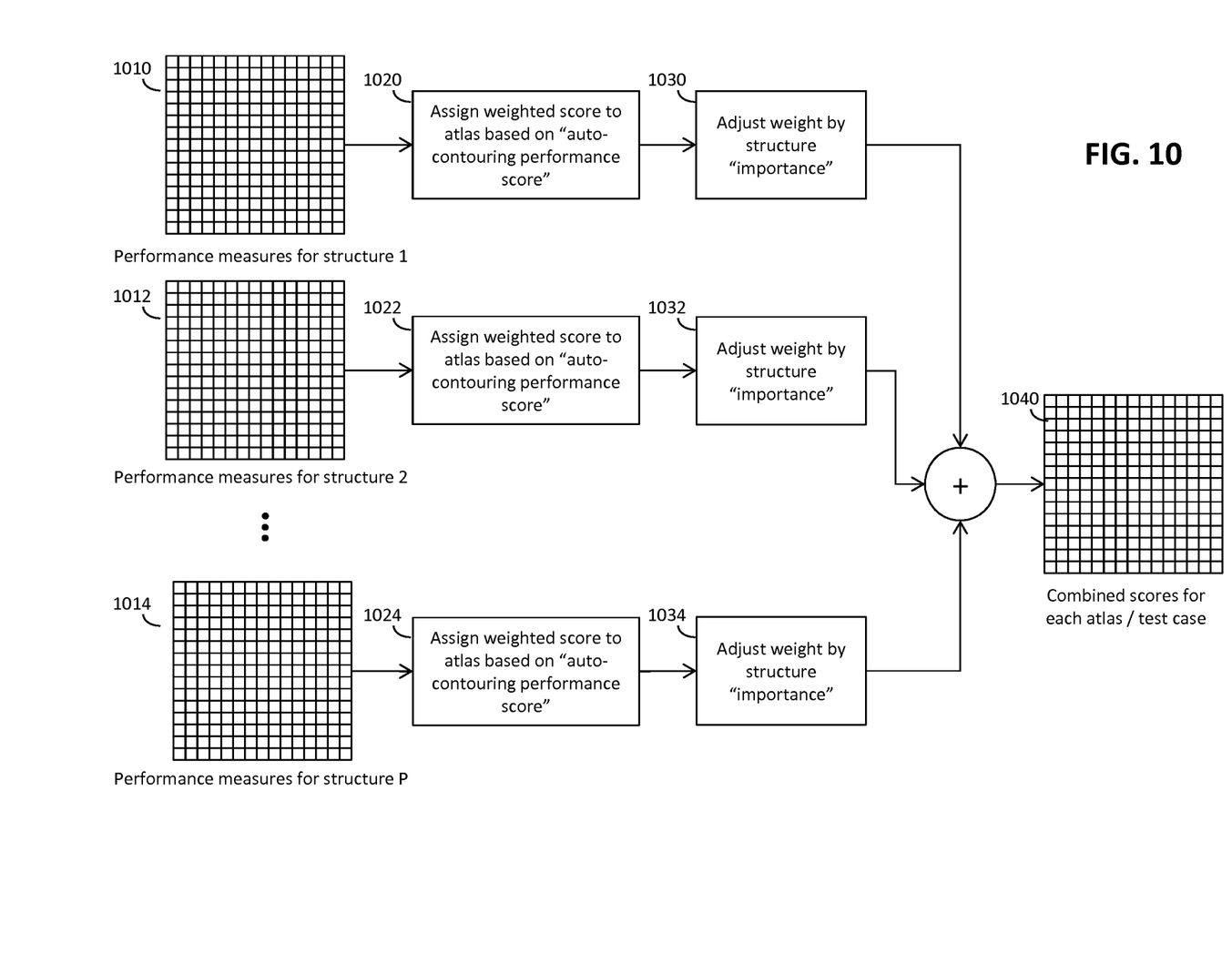
FIG. 10 illustrates an example of an extension of the method of FIG. 3 for atlases comprising multiple structures.

Atlases may comprise multiple delineation structures, for example representing different organs or regions within the medical image. Accordingly, it is contemplated that the method of FIG. 3 may be adapted such that auto-contouring performance measures for each of a plurality of structures within each candidate atlas n may be computed in relation to each training atlas t within the respective subset of training atlases at 335. In this manner, and as illustrated in FIG. 10, computed auto-contouring performance measures for all n:t atlas pair combinations for each structure may be obtained, as indicated generally at 1010, 1012, 1014.

The method of FIG. 3 may further be adapted at 360 such that, for each pair combination of candidate atlas n and training atlas t for which an auto-contouring performance measure has been computed, a score is derived for each structure within the candidate atlas n based at least partly on the computed auto-contouring performance measures. For example, and as indicated at 1020, 1022, 1024 in FIG. 10, the scores derived for each structure and each pair combination of candidate atlas n and training atlas t may comprise a score directly derived from the auto-contouring performance measure, a relative weighting score derived with respect to all pair combinations of candidate atlases n and a common training atlas t, an absolute weighting score for the auto-contouring performance measure, an editing time prediction value, etc. Furthermore, and as indicated at 1030, 1032, 1034 in FIG. 10, the scores for each structure may further be weighted based at least partly on a structure weighting value, for example defined based on a user-defined importance level for each structure.

The method of FIG. 3 may further be adapted at 365 such that, for each candidate atlas n within the set of N candidate atlases, the derived scores for all structures are aggregated for each pair combination comprising that candidate atlas n and t for which auto-contouring performance measures have been computed, and selecting the at least one subset of M candidate atlases from the set of N candidate atlases based at least partly on the aggregated scores for all structures for each pair combination of candidate atlas n and training atlas t for which auto-contouring performance measures have been computed. For example, and as illustrated in FIG. 10, the derived scores for all structures may be combined for each pair combination of candidate atlas n and training atlas t from the set of N candidate atlases and the subset of training atlases, as indicated at 1040. For each candidate atlas n within the set of N candidate atlases, the combined scores for each pair combination comprising that candidate atlas n may then be aggregated.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method of selecting from a set of N candidate atlases at least one subset of M candidate atlases for use by at least one medical image auto-contouring system; the method comprising:
    for each candidate atlas n within the set of N candidate atlases, computing at least one auto-contouring performance measure in relation to each training atlas t within at least a subset of a set of T training atlases;
    for each pair combination of candidate atlas n and training atlas t for which an auto-contouring performance measure has been computed, deriving a score based at least partly on the respective auto-contouring performance measure;
    for each candidate atlas n within the set of N candidate atlases, aggregating the derived scores for each pair combination for which an auto-contouring performance measure has been computed for that candidate atlas n; and
    selecting at least one subset of M candidate atlases from the set of N candidate atlases based at least partly on the most favourable aggregated scores therefor.

2. The method of claim 1, wherein the score derived for each pair combination of candidate atlas n and training atlas t for which an auto-contouring performance measure has been computed comprises at least one of:
    a score directly derived from the auto-contouring performance measure;
    a relative weighting score derived with respect to all pair combinations of candidate atlases n and a common training atlas t for which an auto-contouring performance measures have been computed;
    a relative weighting score derived with respect to a number of training atlases for which at least one auto-contouring performance measure has been computed for the candidate atlas n of the respective pair combination;
    an absolute weighting score for the auto-contouring performance measure; and an editing time prediction value.

3. The method of claim 1, wherein the method comprises computing auto-contouring performance measures for each of a plurality of structures of each candidate atlas n within the set of N candidate atlases in relation to each training atlas t within the respective subset of training atlases.

4. The method of claim 3, wherein the method comprises, for each pair combination of candidate atlas n and training atlas t for which an auto-contouring performance measure has been computed, deriving a score for each of the plurality of structures within the candidate atlas n based at least partly on the computed auto-contouring performance measures, and where the score is based at least partly on a structure weighting value.

5. The method claim 4, wherein the method comprises, for each candidate atlas n within the set of N candidate atlases, aggregating the derived scores for the plurality of structures for each pair combination of candidate atlas and training atlas comprising that candidate atlas n and a training atlas t for which auto-contouring performance measures have been computed, and selecting the at least one subset of M candidate atlases from the set of N candidate atlases based at least partly on the aggregated scores for all structures for each pair combination of candidate atlas n and training atlas t for which an auto-contouring performance measure has been computed.

6. The method of claim 5, wherein the method further comprises determining whether at least one further subset of M candidate atlases is to be selected from the set of N candidate atlases, and if it is determined that a further subset of M candidate atlases is to be selected from the set of N candidate atlases:
    removing the candidate atlases within the previously selected subset of M candidate atlases from the set of N candidate atlases to create a new set of (N-M) candidate atlases;
    and/or removing from the set of T training atlases those training atlases T' for which the candidate atlases within the previously selected subset of M candidate atlases achieved a favourable auto-contouring performance to create a new set of (T-T') training atlases;
    for each candidate atlas n within the new set of (N-M) candidate atlases, computing at least one auto-contouring performance measure in relation to each training atlas t within at least a subset of the new set of (T-T') training atlases;
    for each pair combination of candidate atlas n from the new set of (N-M) candidate
    atlases and training atlas t for which an auto-contouring performance measure has been computed, deriving a score based at least partly on the respective auto-contouring performance measures;
    for each candidate atlas n within the new set of (N-M) candidate atlases, aggregating the derived scores for each pair combination for which an auto-contouring performance measure has been computed for that candidate atlas n; and
    selecting at least one further subset of M candidate atlases from the new set of (N-M) candidate atlases based at least partly on the aggregated scores therefor.

7. The method of claim 5, wherein auto-contouring performance measures are computed for either:
    different candidate atlases within the set of N candidate atlases in relation to different subsets of training atlases from the set of T training atlases;
    or for all candidate atlases within the set of N candidate atlases in relation to the same subset of training atlases from the set of T training atlases.

8. The method of claim 5, wherein the set of T training atlases either comprises of the set of N candidate atlases or the set of N training atlases less the candidate atlas n.

9. An atlas management system comprising at least one processor module arranged to select from a set of N candidate atlases at least one subset of M candidate atlases for use by at least one medical image auto-contouring system; the at least one processor module is arranged to:
    for each candidate atlas n within the set of N candidate atlases, compute at least one auto-contouring performance measure in relation to each training atlas t within at least a subset of a set of T training atlases;

for each pair combination of candidate atlas n and training atlas t for which an auto-contouring performance measure has been computed, derive a score based at least partly on auto-contouring performance measures comprising at least one of:
a score directly derived from the auto-contouring performance measure;
a relative weighting score derived with respect to all pair combinations of candidate atlases n and a common training atlas t for which an auto-contouring performance measures have been computed;
a relative weighting score derived with respect to a number of training atlases for
which at least one auto-contouring performance measure has been computed for the candidate atlas n of the respective pair combination;
an absolute weighting score for the auto-contouring performance measure; and
an editing time prediction value
for each candidate atlas n within the set of N candidate atlases, aggregate the derived
scores for each pair combination for which an auto-contouring performance measure has been computed for that candidate atlas n; and
select at least one subset of M candidate atlases from the set of N candidate atlases based at least partly on the aggregated scores therefor.

10. The atlas management system of claim 9, wherein the at least one processor module is arranged to compute auto-contouring performance measures for each of a plurality of structures of each candidate atlas n within the set of N candidate atlases in relation to each training atlas t within the respective subset of training atlases.

11. The atlas management system of claim 10, wherein the at least one processor module is arranged to, for each pair combination of candidate atlas n and training atlas t for which an auto-contouring performance measure has been computed, derive a score for each of the plurality of structures within the candidate atlas n based at least partly on the computed auto-contouring performance measures, and where the score is based at least partly on a structure weighting value.

12. The atlas management system of claim 10, wherein the at least one processor module is arranged to, for each candidate atlas n within the set of N candidate atlases, aggregate the derived scores for the plurality of structures for each pair combination of candidate atlas and training atlas comprising that candidate atlas n and a training atlas t for which auto-contouring performance measures have been computed, and select the at least one subset of M candidate atlases from the set of N candidate atlases based at least partly on the aggregated scores for all structures for each pair combination of candidate atlas n and training atlas t for which an auto-contouring performance measure has been computed.

13. The atlas management system of claim 10, wherein the at least one processor module is further arranged to determine whether at least one further subset of M candidate atlases is to be selected from the set of N candidate atlases, and if it is determined that a further subset of M candidate atlases is to be selected from the set of N candidate atlases:

remove the candidate atlases within the previously selected subset of M candidate atlases from the set of N candidate atlases to create a new set of (N-M) candidate atlases;
and/or remove from the set of T training atlases those training atlases T' for which the candidate atlases within the previously selected subset of M candidate atlases achieved a favourable auto-contouring performance to create a new set of (T-T') training atlases;
for each candidate atlas n within the new set of (N-M) candidate atlases, compute at least one auto-contouring performance measure in relation to each training atlas t within at least a subset of the new set of (T-T') training atlases;
for each pair combination of candidate atlas n from the new set of (N-M) candidate atlases and training atlas t for which an auto-contouring performance measure has been computed, derive a score based at least partly on the respective auto-contouring performance measure;
for each candidate atlas n within the new set of (N-M) candidate atlases, aggregate the derived scores for each pair combination for which an auto-contouring performance measure has been computed for that candidate atlas n; and
select at least one further subset of M candidate atlases from the new set of (N-M) candidate atlases based at least partly on the aggregated scores therefor.

14. A non-transitory computer program product having executable program code stored therein for selecting from a set of N candidate atlases at least one subset of M candidate atlases for use by at least one medical image auto-contouring system, the program code operable for:
for each candidate atlas n within the set of N candidate atlases, computing at least one auto-contouring performance measure in relation to each training atlas t within at least a subset of a set of T training atlases;
for each pair combination of candidate atlas n and training atlas t for which an auto-contouring performance measure has been computed, deriving a score based at least partly on the respective auto-contouring performance measure;
for each candidate atlas n within the set of N candidate atlases, aggregating the derived scores for each pair combination for which an auto-contouring performance measure has been computed for that candidate atlas n; and
selecting at least one subset of M candidate atlases from the set of N candidate atlases based at least partly on the most favourable aggregated scores therefor.

15. The non-transitory computer program product of claim 14, wherein the non-transitory computer program product comprises at least one from a group including: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

* * * * *